Figure 1:
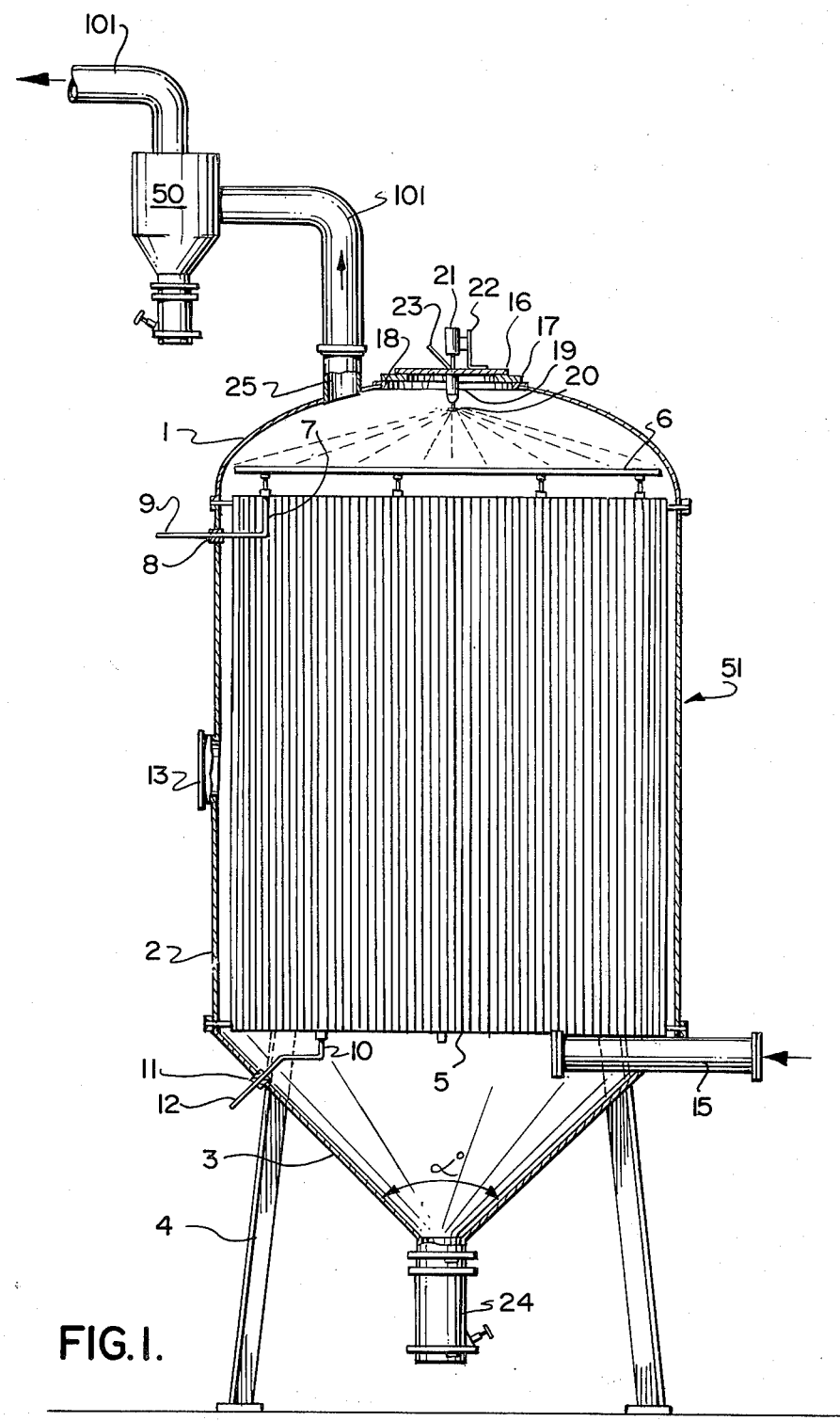

United States Patent
Passey

[11] 3,909,957
[45] Oct. 7, 1975

[54] APPARATUS FOR FREEZE-DRYING

[76] Inventor: Arjun Dev Passey, P.O. Box 1066 154 Green St., Lunenburg Nova Scotia, Canada

[22] Filed: July 15, 1974

[21] Appl. No.: 488,804

Related U.S. Application Data

[63] Continuation-in-part of Ser. No. 162,607, July 14, 1971, abandoned.

[52] U.S. Cl. .......................................... 34/92; 34/5
[51] Int. Cl.² ........................................ F26B 13/30
[58] Field of Search ................................ 34/5, 92

[56] References Cited
UNITED STATES PATENTS

| | | | |
|---|---|---|---|
| 3,146,077 | 8/1964 | Fuentevilla | 34/92 |
| 3,633,283 | 1/1972 | Mishkin | 34/92 |
| 3,656,240 | 4/1972 | Van Dijk | 34/92 |
| 3,795,986 | 3/1974 | Sutherland et al. | 34/92 |

*Primary Examiner*—John J. Camby

[57] ABSTRACT

The present invention provides a freeze-drying system substantially eliminating the need to supply heat from an external heat source for freeze-drying a material, which system comprises in combination, a drying chamber, a means for passing said material through said drying chamber, a heat pump system (including one or more of the first, second and third heat pump means), an evacuation means including the first heat pump means of said heat pump system, and a heat exchange means for supplying heat to said material such that the need to supply heat from an external heat source is substantially eliminated by recycling the heat between the judiciously selected heat sources and main heat sinks found within the freeze-drying system of my invention, said recycling of heat being achieved by the said heat pump system. Further, the requirements for mechanical energy and cooling water are minimal for the freeze-drying system of my invention, thus resulting in tremendous savings in cooling water and mechanical energy (and fuel required therefor) and in tremendous reduction in the amount of heat rejected to the environment. The freeze-drying system of the present invention can also be used for vacuum drying, including concentration of the material by partial removal of the liquid phase.

22 Claims, 3 Drawing Figures

APPARATUS FOR FREEZE-DRYING

This is a continuation in part application of my co-pending application Ser. No. 162,607, filed July 14, 1971 now abandoned.

The present invention relates to an improved system for continuous vacuum drying, preferably freeze-drying, of materials such as foodstuffs including fruits and vegetables and their juices as well as other foods and beverages such as tea and coffee extracts, and in particular coffee extract. In particular the present invention relates to a continuous freeze-drying system for the drying of particulate frozen material in which the need to supply heat from an external heat source is substantially eliminated, the drying rate is substantially increased, and in which the temperature and vacuum pressure necessary to effect drying of material is moderate providing for a substantial reduction in the cost of producing the freeze-dried material whilst at the same time maintaining the product quality.

As will be described later in details, the freeze-drying system of my invention comprises in combination a drying chamber, an evacuation means, a heat pump system (including one or more of the first, second and third heat pump means), a means for passing the material to be dried through the said drying chamber, and a heat exchange means such that the need to supply heat from any external heat source is substantially eliminated by recycling the heat between the judiciously selected heat sources and main heat sinks found within the freeze-drying system of my invention, said recycling of heat being achieved by the said heat pump system. The said evacuation means further includes an absorber-regenerator-condenser combination means interlinked by the said heat pump means whereby to provide for stable operation of my freeze-drying system.

In the preservation and processing of materials such as foodstuffs and in particular coffee extract, freeze-drying as compared with other dehydration processes such as spray drying is being increasingly accepted as it has many advantages including the preservation of aroma, flavor, nutritional and functional values, the stability of well packaged product refrigeration, and ease of reconstitution. However, a major disadvantage with freeze-drying is the much higher processing costs and there is an ever present requirement to substantially reduce the costs of freeze-drying material without substantially sacrificing product quality and stability. Thus at the present time the conventional freeze-drying is an expensive form of food preservation as compared with other dehydration processes such as spray drying. The primary reasons for high processing costs of conventional freeze-drying processes, such as the batch and semi-continuous batch processes, are the heavy requirements for thermal and mechanical energy for processing, and for other utilities in addition to the relatively large initial investment in the conventional freeze-drying plants, which are attributable to the thermodynamic short-comings of conventional freeze-drying systems, the batch nature of the operations, and the physical characteristics of the frozen material being dried, which characteristics adversely influence the operating parameters of the freeze-drying process of the conventional freeze-drying systems. Thus in the conventional freeze-drying processes the rate limitations imposed by heat and mass transfer considerations lead to high processing costs.

In the conventional commercial freeze-drying systems in vogue the frozen material in block or particulate form is loaded suitably, into trays (e.g. in the Mishkin et al. U.S. Pat. No. 3,620,776) or on material supporting conveyor (e.g. in the Smith's U.S. Pat. Nos. 3,266,169 and 3,672,911), into a drying chamber and heat is applied thereto from platens or from radiant surfaces which heat is procured from heat source(s) external to the freeze-drying system, and the water vapor generated during freeze-drying of said material is removed by means of conventional means, in particular a surface condenser, which is usually located as near to the frozen material as possible to improve the efficiency of drying. Such conventional freeze-drying systems incorporating radiant heating of the top surface and simultaneous contact heating of the bottom surface of freeze-drying material provide an average drying rate of no more than 1 mm of thickness per hour corresponding to a drying rate of about 1 kilogram per hour per meter$^2$ of shelf area supporting the drying material in the drying chamber. In order to improve this low drying rate the freeze-drying industry has made numerous modifications in the plant including the use of movable platens in place of fixed platens, the modification of the configuration of platens and trays, the vibrating of the trays, the fluidization of the particulate frozen material (e.g. in the Mink et al. U.S. Pat. No. 3,239,942), and the removal by scraping of the dried layer as it forms on the blocks of freeze-drying material, and including the operation of batch processes on a semi-continuous batch basis by using multicabinet system. Methods of effecting freeze-drying involving fluidization techniques using dehumidified air that have been proposed (e.g. Mink et al. U.S. Pat. No. 3,239,942) are subject to further disadvantage of water vapor having to diffuse through the air and the drying rates achieved are no better than those of other commercial conventional freeze-drying systems. Atomizable materials have also been pre-frozen in non-slab, non-particulate form to take some advantage of the reduced thickness of the frozen material in the hope of reducing the necessary exposure of material to freeze-drying conditions. In particular, proposals have been made for freezing the atomizable material in the form of thin shells inside a rotating container, in the form of ribbons, in the form of flakes and tubes, and in the form of thin films or thin shells. However again, the drying rates have not been substantially improved by these processes and such conventional systems are further subject to inherent disadvantages which detract them from their commercial applicability.

However only partial success has been achieved by the industry due to the aforesaid modifications which are but mechanical in nature, and the drying rates in the conventional freeze-drying systems despite aforesaid modifications are still relatively low being less than 2 kilogram per hour per meter$^2$, and in many cases this slight improvement of drying rate has been achieved by sacrificing the product quality. Further, in such conventional systems it has been found necessary to maintain a low vapor pressure in the drying chamber — of the order of less than 250 millitorrs — which results in substantial vacuum equipment and energy requirements. Furthermore in order to avoid melting in the frozen material with a consequent product deterioration, it is necessary for the evacuation and refrigeration equipment of conventional freeze-drying systems to be capable of lowering the temperature and vapor pressure in the drying chamber rapidly to the proper operating levels which results in substantial additional evacuation and refrigeration equipment and energy requirements, and moreover in each operation the material supporting means (trays, conveyors, etc.) and ancillary equipment in the drying chamber also have to be cooled and then heated again which requires the nonproductive expenditure of thermal and mechanical energy, and utilities by the equipment. Furthermore the heating platens and product supporting means and ancillary equipment take up valuable space in the drying chamber which detracts from the maximum utilization of the drying chamber in the conventional freeze-drying systems. Prefreezing the material outside the drying chamber and transporting it to and loading it into the drying chamber prior to establishing the freeze-drying conditions in the drying chamber, which are usual requirements of conventional freeze-drying processes, also involve substantial labor costs, lost time, and possible melting and deterioration of the frozen material, and long drying cycles coupled with temperature variations and delays between freezing and drying degrade the quality of the product.

Sticking of the freeze-drying material to the material supporting surfaces in the drying chamber, and the formation of soft sticky masses in freeze-drying of some materials (e.g. coffee extract) is also a major problem in the conventional freeze-drying systems. Difficulties with sticking and performance are also encountered in the conventional freeze-drying systems if the concentration of solids in the starting aqueous mixture to be freeze-dried exceeds 25% by weight (for example, see: British Pat. No. 1,086,251, p. 6, lines 3–6). A further problem with the conventional freeze-drying systems is that in order to obtain even the aforesaid limited rate of drying (of less than 2 kilogram per hour per meter$^2$), the concentration of solids in the material to be frozen and subsequently freeze-dried should be low, e.g. of the order of 20–25% for coffee extract, because with higher concentration of solids the dried layer formed on the drying material is compact and strongly retards the removal of water vapor from the frozen core during the course of drying, requiring higher vacuum. Thus to be economical it has been found necessary to remove as much as 3 pounds of water for every pound of coffee produced in the conventional freeze-drying systems with the result that the cost of freeze-drying per pound of freeze-dried product is as much as 3 times the cost of removing each pound of water.

The prior art freeze-drying systems therefore suffer from one or more of the following conventional features:

a. require heat to be supplied to the freeze-drying material from external heat source(s); and
b. freeze-dry material while it is supported on some kind of a surface in the freeze-drying chamber; and
c. conventional means for condensing water vapor which means result in enormously high requirements for mechanical and/or thermal energy — thermal energy required being supplied from external heat source(s) — and utilities (e.g. cooling water) and therefore also result in enormously high quantity of heat rejection to the environment; and/or
d. freeze the material outside the freeze-drying chamber; and/or
e. require handling, transportation and loading of the prefrozen material, which material was frozen elsewhere (outside the freeze-drying chamber), into the freeze-drying chamber; and
f. large quantities of water have to be removed to produce freeze-dried product, e.g. in case of coffee as much as 3 pounds or more of water has to be removed to produce a pound of freeze-dried coffee; and
g. low drying rates and high processing costs, etc.

The freeze-drying system of my present invention overcomes the shortcomings associated with the aforesaid disadvantageous features of conventional freeze-drying systems.

The freeze-drying system of my present invention is, among other things, capable of effecting freeze-drying at substantially increased drying rates and in a preferred embodiment up to 7.5 kilogram per hour per meter$^2$ without substantial deterioration of the product and ensures a good quality protection during processing. As shown hereinafter (p. 42, line 12 to p. 47, line 11) a much higher solids concentration in the material to be freeze-dried is easily handled in my freeze-drying system without any problem because the material is dried while in suspension in the drying chamber. Further the freeze-drying system of my invention can be operated at a relatively moderate vapor pressure of the order of about 2,000 millitorrs in the drying chamber thus reducing the requirements of vacuum plant and the energy required to operate the system. Of course there is no need to supply heat to the freeze-drying system of my invention from any external heat source, and the requirements for mechanical energy and cooling water are also minimal resulting in tremendous savings in mechanical energy and fuel required therefor and causing minimal amount of heat to be rejected to the environment.

The present invention includes an evacuation means which is not subject to the frosting and defrosting problems usually associated with surface condensers as a means of water vapor disposal, and possesses an inherent stability to permit stable operation of the freeze-drying system which stability is not always possible when employing conventional surface condensers, and thus is particularly useful in the freeze-drying system of my present invention. A refrigeration temperature of about 0°C is adequate in this evacuation means of my freeze-drying system as compared with a much lower temperature (−40°C or lower) required in the conventional surface condensers, thus reducing further the mechanical energy, and utilities required.

The present invention thus provides a continuous system substantially eliminating the need to supply heat from an external heat source for freeze-drying a material which system comprises in combination, a drying chamber, a means for passing said material in particulate frozen form through said drying chamber maintained at vapor pressure below the triple point pressure of ice, a means for supplying heat to said particulate material in said chamber by means of a heat pump system to cause sublimation of ice in said frozen material to effect drying thereof during said passage, said material being substantially dried while it is in suspension within said chamber, and a means for continuously withdrawing water vapor from said chamber and condensing said water vapor by bringing it in contact with suitable absorbent medium which medium then becomes heat source for a heat pump system (second heat pump means) used in my invention for supplying heat to said material.

While the particulate frozen material passed through the said chamber may be formed externally of the said chamber by freezing the material in non-particulate form such as in the form of blocks or flakes followed by crushing and sieving, in a preferred embodiment of the present invention the particulate material is formed in situ in the drying chamber in which the aqueous mixture of an atomizable material is atomized, by means of an atomizer, in the drying chamber. The atomized material freezes almost instantly due to the prevailing vacuum conditions compatible with freeze-drying and the frozen particles can remain in the drying chamber until dried to the desired moisture content while they are still in suspension and settling. In particular, in the process of the present invention the atomizable material to be freeze-dried is supplied to the atomization device of the chamber by means of normal feed side equipment, after having received the necessary pre-treatment. The atomization device may be one or more pressure nozzles or centrifugal discs and is protected against potential hazards of freezing. When the partial pressure of the water vapour in the freeze-drying chamber is maintained below the triple point pressure of water, the material being atomized inside the drying chamber freezes almost instantly and this evaporation freezing is accompanied by uniform loss of about 12% to 20% of the moisture originally present thus resulting in a saving of thermal and mechanical energy. Moreover this instant freezing by atomization also prevents freezing damage resulting from the increasing concentration of solute. Thus, the almost instant evaporation freezing of the atomized material allows the particles to quickly pass through the temperature zone at 0° to −5°C usually responsible for product damage associated with slow cooling. The vacuum required in the drying chamber is a function of the characteristics of the substance being freeze-dried e.g. its minimum temperature for incipient melting, the characteristics of the dried layer and the expected maximum and minimum size of the particles.

Thus the apparatus for use in the process of the present invention includes one or more drying chambers of geometry consistent with the physical properties of the feed supplied to the atomizer, the desired physical properties of the product, the type of atomization equipment and other factors which directly or indirectly influence the performance. Providing adequate residence time and height to the drying particles is vitally important in the successful operation of the process of the present invention. The main drying zone must be high enough to allow the particles to dry to the desired level of moisture while they are still in suspension and large enough to avoid the atomized material from contacting the walls of the drying apparatus before the particles have dried to the required level. The main drying chamber is designed for the following classification of the drying particles. Those of larger size settle down in such a way that the largest particles will have dried to the desired moisture level while in suspension before reaching the lower zone of the drying chamber. The size of the largest particle is one of the factors influencing the dimensions of the drying chamber. Thus the particles larger than the critical size freeze-dry while in suspension in the drying chamber and while settling down whereas the smaller particles are carried away by the water vapor and gases evolved in the drying chamber during the course of drying. The water vapor (including any gas(es) accompanying it) exiting from the drying chamber and carrying the smaller particles in suitably passed to a separation device, which may be any conventional device for separating solids from gases, by way of a vacuum line where these smaller particles are separated from the vapor and subsequently dried to the desired moisture content. The water vapor then follows the vacuum line to an evacuation system for disposal of the water vapor.

The separation device for the separation of fine particles from the low pressure water vapor leaving the drying chamber may consist of one or more separation chambers operated in series or parallel. The separation chamber may be a suitably designed cyclone/multicyclone or some other device such as a dynamic separator. In order to free water vapor from the fine particulate material as completely as desired, the separation chamber may be followed by a section of filter bags or some other supplementary separation devices. In the separation device heat is supplied to the drying particulate material by a heat pump system to effect the freeze-drying thereof.

The drying chamber and the separation chamber are preferably provided with a shallow fluidized bed drying zone in their lower section through which the dried particulate materials settle down. In the fluidized bed drying zone the particles not already dried to the desired residual moisture level may be further dried by losing moisture to the fluidizing vapors. Thus a portion of the water vapor leaving the separation equipment is suitably bled, slightly recompressed and reheated by a heat pump system before being supplied to the shallow fluidized bed drying zone in the chambers where it serves as the fluidizing medium. This fluidizing water vapor subsequently mixes with the water vapor evolving from the drying particulate material thus increasing the water vapor in the chambers. This condition favors the suspension of the particulate material and permits the use of shorter drying chamber. In another embodiment of the present invention the particulate material may be removed from the drying and separation chambers by means of vacuum locks and led into a fluidized bed dryer disposed outside the chambers where the particles may be further dried in the shallow fluidized bed using the slightly recompressed and adequately reheated low pressure bled water vapor from the drying chamber. In comparison with conventional fluidized bed drying, this technique has the following advantages: inter alia one obtains better quality and better moisture control in the final product, lower costs are involved in the drying, and the required height of the chambers for a given drying capacity and residual moisture in the finished product is reduced. Alternatively, the slightly recompressed and reheated bled water vapor may be introduced directly into the drying chamber to create a controlled turbulence therein which turbulence will also help to increase the heat transfer with and the mass transfer from the drying particles in the drying chamber and provide an additional means of controlling the process, making it more flexible.

Indirect heat exchangers stay inside the drying chamber and the separation chamber and provide the main source of heat with which the freeze-drying particles eventually exchange heat. Their design and position inside the chamber is preferably such as to not allow the heat exchanger to come into contact with or to unduly obstruct the path of the freeze-drying particles. The heat exchanger should not cause an unreasonably large pressure loss in the flowing water vapor. The slightly recompressed and reheated bled water vapor which may be introduced through the shallow fluidized bed drying zone and/or directly into the drying chamber can serve as an additional means to supply heat to the drying particles.

In a preferred embodiment of the present invention infrared or microwave energy may also be used in the drying system and suitable combinations of heating media and such radiation may be used for supplying the necessary energy. Thus because of the limitations placed by the rate at which heat can be transferred to the receding interface in the drying particulate material and of the relatively negligible resistance to mass transfer, the process of the present invention may be improved by modifying the thermal and transport properties of the dried layer, and also by employing infrared and/or microwave energy. Further, since the drying rate in the system of the present invention is not rate limited with respect to the mass transfer, my freeze-drying system presents several advantages in comparison with conventional freeze-drying systems limited with respect to mass transfer. For example, in my drying system, higher vapor pressure can be maintained in the drying chamber, resulting in various direct and indirect benefits; a high concentration of solids can be permitted in the material to be freeze-dried, consequently increasing further the throughput of the freeze-drying system when it is coupled with a gentle concentration process such as a freeze-concentration process.

The heating medium used for providing heat in the drying chamber and separation chamber will depend to a great extent upon the available resources. Thus when a sufficient quantity of steam in suitable form and thermodynamic state is cheaply available, e.g. process or bled steam, it may be desirable to condense the steam in the heat exchangers in order to supply the heat in the drying chamber and separation chamber. However, the heat in the drying chamber and separation chamber may be suitably provided from the evacuation means of the freeze-drying system of the present invention particularly where cheap electricity is available, for example from hydroelectric or atomic power stations, or where fuel for raising steam may be in short supply, or where adequate supply of natrual heat sink, e.g. cooling water, is not available. In such situations the refrigeration and heat pump system (one or more of the first, second and third heat pump means) of the freeze-drying system of the present invention assume great importance.

Thus, according to a preferred embodiment of the present invention the heat for the drying of material in the drying and separation chambers is supplied from a novel heat pump system, the heat source for this heat pump system being the compressed second refrigerant vapor from an absorbent refrigeration system (second heat pump means) which vapor condenses in a heat exchange means as will be described in details later.

The evacuation means forms a critical part of any vacuum and/or freeze-drying system. In particular, in a evacuation means the relative ratio of the surface area of the material to be dried to the surface area of the condensing surface is very important, and has to be usually less than one in order to ensure stable operation. Conventional surface condensers are subject to the major shortcoming that they are of fixed surface area and thus are not generally capable of providing the necessary continuous stable operation of the continuous freeze-drying system of the present invention because the surface area of the material to be dried is not fixed, i.e. is variable and is continuously being generated, whereas the surface condenser would have a fixed condensing surface area, and as such there can not always exist a proper balance between the rate of area generation of material for drying and the fixed surface area of a surface condenser. Therefore if a fixed surface condenser were to be used in conjunction with the drying system of the present invention, the surface condenser would become incapable of providing the necessary evacuation of the drying chamber after a short period of operation due to lack of proper balance. The present invention therefore provides an evacuation means in which the condensing surface is being continuously generated and which is thus capable of properly handling the evacuation of the drying chamber in the freeze-drying system of the present invention. However, while the evacuation means of the present invention is particularly suitable for operation in the freeze-drying process of the present invention, it is also applicable with advantages, to any freeze-drying process and any vacuum drying process, i.e. any process which requires removal of condensible vapors. The evacuation means of the present invention is also exempt from the frosting and defrosting problems usually associated with a surface condenser as a means of water vapor disposal. A feature of the evacuation means of the present invention is a properly controlled system of absorber-regenerator-condenser units interlinked by means of refrigeration and heat pump system employing the heat sources and the main heat sinks found within the freeze-drying system of the present invention.

While the drying system of the present invention is mainly a freeze-drying system, it will be realized that whether freeze-drying occurs in the drying chamber in a particular situation is a matter of pressure level of vapors surrounding the drying material — freeze-drying of a material occurs when the vapor pressure of the substance to be removed to effect drying of said material is below the triple point pressure of said substance (e.g. 4.58 torrs in case of water), and vacuum drying occurs when the said vapor pressure is subatmospheric but yet above the said triple point pressure. The drying system of the present invention, therefore, is also applicable to vacuum drying including concentration of the material by partial removal of the liquid phase under vacuum.

Thus there is provided in the drying system of the present invention, an evacuation means for continuously removing vapor from a drying chamber as it is generated in said chamber in the vacuum drying of a material, said means comprising an absorber through which a liquid absorbent medium is continuously passed, said absorbent medium being at a sufficiently low temperature to provide in said absorber a vapor pressure substantially lower than in said chamber, whereby to cause vapor to rapidly pass from said chamber to said absorber and be absorbed in said absorbent medium, an evaporator in which absorbed substance is evaporated from the absorbent medium passing therethrough from said absorber, at a rate similar to that at which said vapor is absorbed in said absorbent medium in said absorber by heat exchange with a condensing first refrigerant, a condenser in which vapor from said evaporator is condensed by heat exchange with evaporating first refrigerant, a first heat pump means adapted to compress at least a portion of first refrigerant vapor from said condenser, preferably after suitable superheating thereof, pass the first refrigerant vapor so compressed to said evaporator and pass condensed first refrigerant from said evaporator through an expansion valve to said condenser, preferably after suitable subcooling thereof, said first heat pump means including a cooling means for removing excess heat from said refrigerant to maintain a heat balance in said evaporator and in said condenser, and a chiller adapted to cool the heated absorbent medium from said evaporator to restore the absorbent medium to the desired temperature for said absorber, by heat exchange with an evaporating second refrigerant, for passage to said absorber.

The heat extracted by the chiller from the absorbent medium may be used in any manner as desired and may be passed by means of a second refrigerant evaporating in the chiller to an external heat sink (e.g. cooling water). However, according to a particularly preferred embodiment of the present invention at least a portion of the heat extracted from the absorbent medium in the chiller is used to supply heat to the particulate material in the drying chamber or the separator or both. According to a particularly preferred embodiment of the present invention therefore the absorbent medium in the chiller is cooled by heat exchange with an evaporating second refrigerant, the drying system including a second heat pump means adapted to compress at least a portion of second refrigerant vapor from said chiller, preferably after suitable superheating thereof, and pass the second refrigerant vapor so compressed to a heat exchange means for supplying heat to the material in said chamber and passing the condensed second refrigerant from said heat exchange means through an expansion valve to said chiller, preferably after suitable subcooling thereof, said second heat pump means including a cooling means for removing excess heat from said second refrigerant to maintain a heat balance in said chiller and in said heat exchange means.

The present invention also provides in combination with a drying chamber the aforesaid evacuation means.

While in one embodiment of the drying system of the present invention at least a portion of the second refrigerant vapor from the chiller may be compressed in a compressor, preferably after suitable superheating thereof, and the so compressed second refrigerant vapor from the compressor may be used directly to supply heat in the drying chamber, it is preferable from a practical point of view, allowing for the efficiency of the compressor, to compress in stages which provide for maximum efficiency in the utilization of the compressors. Thus in a preferred embodiment of the present invention the said heat exchange means comprises a cascade heat exchanger in which at least a portion of the compressed second refrigerant vapor is condensed while exchanging heat with an evaporating third refrigerant and a third heat pump means is provided adapted to compress at least a portion of the vapor of the third refrigerant from said cascade heat exchanger, preferably after suitable superheating thereof, pass the so compressed third refrigerant vapor to a heat exchanger means of said chamber for heat exchange therein and pass condensed third refrigerant from said heat exchanger means of said chamber, preferably after suitable subcooling thereof, through an expansion valve to said cascade heat exchanger, said third heat pump means including a cooling means for removing excess heat from said third refrigerant to maintain a heat balance in said cascade heat exchanger and in said heat exchanger means of said chamber.

The present invention also provides a heat pump system (one or more of the first, second and third heat pump means, each) adapted to continuously withdraw heat from a heat source and to continuously deliver heat at the required rate to a heat sink such that the ratio of heat delivered to heat withdrawn may be controlled by a cooling means, said heat pump system comprising a combination of means through which a refrigerant is circulated, said combination of means including an evaporator wherein the said refrigerant withdraws heat from said heat source, a bleeding means for bleeding a portion of low pressure refrigerant vapor coming from said evaporator, a compressor adapted to compress the remaining unbled portion of refrigerant vapor coming from said evaporator, a condenser in which the refrigerant vapor so compressed is condensed and delivers heat at the required rate to said heat sink, a cooling means for balancing the rates of heat delivery and heat withdrawal, an expansion valve for expanding the condensed refrigerant from said condenser into said evaporator, and a liquid-vapor suction line heat exchanger for adequately superheating the unbled portion of refrigerant vapor prior to compression thereof in said compressor.

Suitably the cooling means in the heat pump system comprises a means for condensing a portion of low pressure refrigerant vapor by heat exchange with an external heat sink, such as cooling water in a water cooled heat exchanger, and a means for recycling the so condensed refrigerant to said evaporator wherein said refrigerant receives heat from the said heat source. Further, heat may also be removed from the heat pump system by means of a cooling medium subcooler located between the condenser of the heat pump system and its expansion valve, i.e. by "subcooling means", by losing heat to an external heat sink (e.g. cooling water) and thus provide subcooling of the liquid refrigerant in order to control the ratio of the heat delivered to the heat withdrawn.

The drying system of the present invention thus includes a properly controlled heat pump system (one or more of the first, second and third heat pump means, each) operating between the properly selected heat sources and main heat sinks found within the drying system. The heat source of the heat pump system of the present invention is always a commodity which must lose heat at a definite rate for the system to be fully operative, e.g. the vapor from the evaporator of the evacuation means which vapor is condensed to serve as the heat source for the first heat pump means, the absorbent medium of the evacuation means which medium must be cooled to proper temperature in the chiller where it serves as the heat source for the second heat pump means, or the condensing second refrigerant in the cascade heat exchanger wherein it serves as the heat source for the third heat pump means. The main heat sink for the heat pump system of the present invention is always a comodity which must receive heat for the invention to be fully operative, e.g. the absorbent medium concentrating in the evaporator of the evacuation means wherein it serves as the heat sink for the first heat pump means, the evaporating third refrigerant in the cascade heat exchanger wherein it serves as the heat sink for the second heat pump means, or the material receiving sublimation or process heat which material serves as the heat sink for the third heat pump means.

Through proper selection of the heat sources and the main heat sinks found within the drying system of present invention, these heat pump systems are responsible for substantially eliminating the need for external heat source(s) for supplying the sublimation/process heat for drying and the process heat for regenerating the absorbent medium by evaporation, and also contribute to other economic advantages including reduced thermal pollution of the environment and conservation of natural resources.

The basic concept in the heat pump system of the present invention is the method and means for balancing and coordinating the needs and requirements of various heat sources and heat sinks. Without such a proper coordination, the heat pump system can not be efficiently used. Depending upon the temperature levels and the thermodynamic properties of the refrigerant used, it is simple to determine, for each situation, the ratio of heat delivered to refrigeration performed (heat withdrawn). An order of magnitude of this ratio can be reasonably estimated based on "Carnot Cycle". In conventional freeze-drying systems, with the heat source for sublimation at a temperature of 100°C and the surface condenser for desublimation of water vapor at a moderate temperature of $-40°C$, the ratio of heat delivered to refrigeration performed is about 1.6 based upon the Carnot Cycle and perhaps would be about 2 or more under actual operating conditions.

On the other hand, in actual practice, the rates at which heat has to be supplied and abstracted are of the same order of magnitude in the freeze-drying process. By practicing the method of balancing the needs and requirements of the heat sources and the heat sinks according to the present invention by the "subcooling means" it is possible to adjust and control the heat pump system at all times in order to ensure a desired ratio between heat delivered to heat sink and heat withdrawn from heat source.

The heat pump system of the present invention is adapted to continuously withdraw heat from a heat source from which heat must be withdrawn and to continuously deliver heat to a heat sink where it is required, both the heat withdrawal and heat delivery being effected at the desired rates, and comprises a compressor adapted to compress at least a portion of refrigerant vapor coming by way of suction line from an evaporator (of heat pump system) wherein the refrigerant receives heat from said heat source and pass compressed refrigerant vapor to a first condenser wherein the compressed refrigerant vapor condenses by losing heat to said heat sink. The condensed refrigerant leaves the first condenser by way of a liquid line and is subcooled for the purpose of "subcooling control" by losing heat to a process stream and/or a natural heat sink, e.g. cooling water, in a cooling medium subcooler provided for this purpose. The partially subcooled liquid refrigerant leaves the subcooler by way of a liquid line in a thermodynamic condition compatible with ensuring adequate superheating of the suction vapor (coming from said evaporator) in a liquid-vapor suction line heat exchanger which suction vapor enters the liquid-vapor suction line heat exchanger by way of the suction line and leaves adequately superheated by way of a suction line on its way to said compressor. In passing through the liquid-vapor suction line heat exchanger, the partially subcooled liquid refrigerant is further subcooled by exchanging heat with the suction vapor which in turn gets adequately superheated, and the subcooled liquid refrigerant leaves by way of a liquid line on its way to the said evaporator (of the heat pump system).

Depending upon the prevailing temperature conditions or some other thermodynamic considerations, the sequence of subcooling in the cooling medium subcooler and in the liquid-vapor suction line heat exchanger may be interchanged.

On its way to the evaporator, the subcooled liquid refrigerant is expanded by a first expansion valve in to said evaporator wherein the expanded refrigerant withdraws heat from said heat source and thereby evaporates. The refrigerant vapor leaves the evaporator by way of the suction line.

In order to ensure a preliminary control of the ratio of heat delivered to heat withdrawn under steady state conditions, a proportioning bypass control valve bleeds just the right quantity of low pressure refrigerant vapor coming by way of the suction line from said evaporator to leave a sufficient quantity of refrigerant vapor along the suction line to said compressor so that the unbled fraction of suction vapor after sufficient superheating in passing through the liquid-vapor suction line heat exchanger follows the suction line to said compressor in order to be compressed to deliver heat at the required rate as it condenses in said first condenser. The suction vapor that is bled by the proportioning bypass control valve is handled, depending upon its thermodynamic state, to allow it to be condensed by exchanging heat with a heat sink such as cooling water. Compression of this bled suction vapor in a booster compressor may be necessary in some cases before it can be so condensed.

The bypassed refrigerant vapor follows a vapor line, is condensed in a second condenser, passes through a liquid line, and is expanded by a second expansion valve into the said evaporator (of the heat pump system) wherein it evaporates along with the liquid refrigerant expanded by the first expansion valve.

It has been found that the independent "subcooling control" achieved by means of partial subcooling in the cooling medium subcooler (i.e. by subcooling means) ensures control of the ratio of heat delivered and heat withdrawn, and this ratio can be conveniently made equal to a predetermined desired value, for example unity, which is the desired ratio in the case of drying applications.

Each of the first, second, and third refrigerants are selected so as to be suitable for their particular application, and may be same or different. Thus while the first and the third refrigerant may be the same refrigerant, preferably they are different from the second refrigerant, and are more suitable for the temperatures involved in the process. Further the compressors in the first, second, and third heat pump means may be single or multistage compressors, and there may be one or a plurality of such compressors, and of evaporators, condensers, subcoolers, etc.

The evacuation system of the present invention has particular application to the freeze-drying of material such as foods and beverages, and in particular tea and coffee, whence water vapor is removed from the drying chamber and separation chamber and the absorbing medium is suitably an aqueous solution of a water vapor pressure depressant such as a glycol or a salt, e.g. a lithium halide, in particular lithium bromide.

DESCRIPTION WITH REFERENCE TO DRAWINGS

Figure 2:
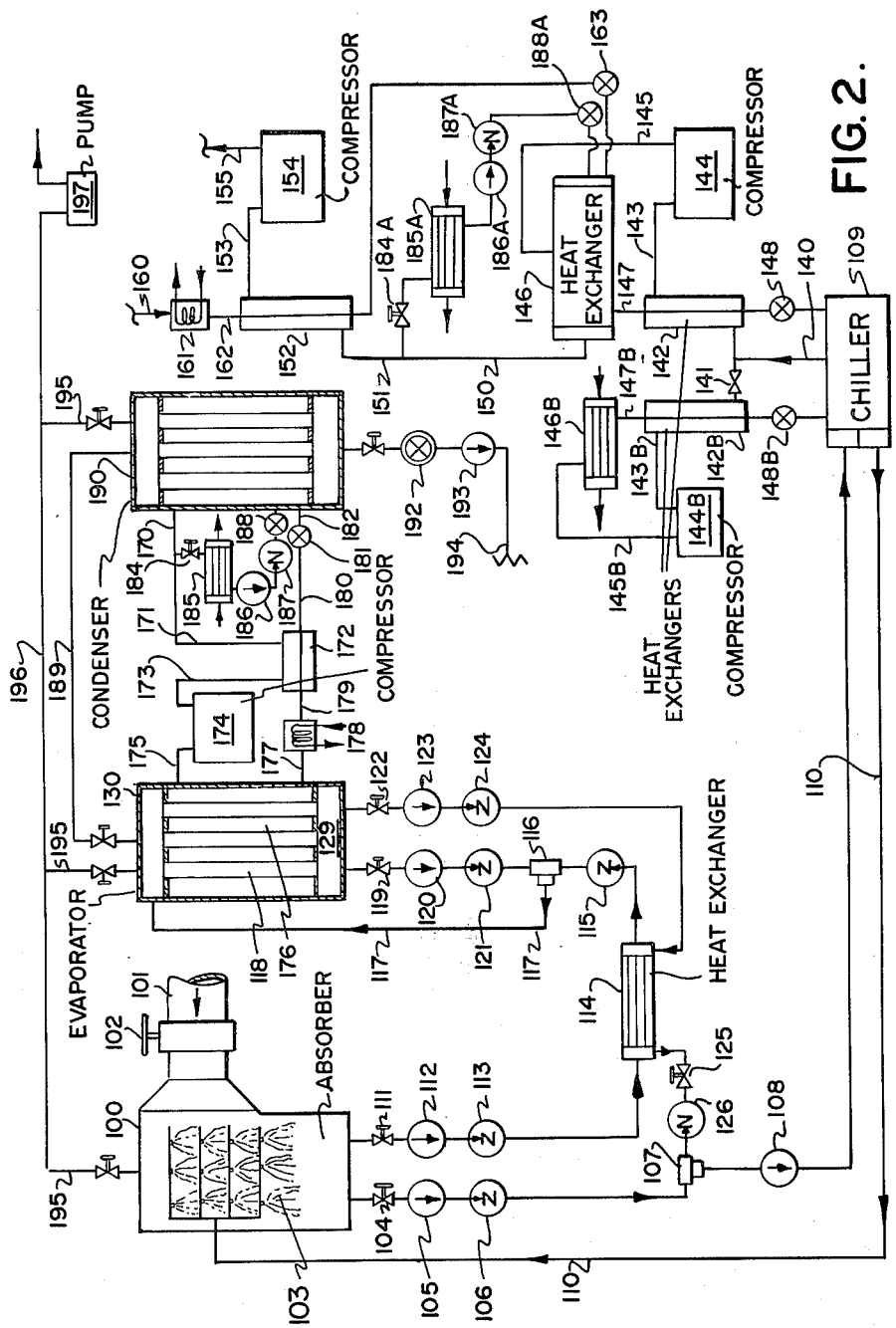
Figure 3:
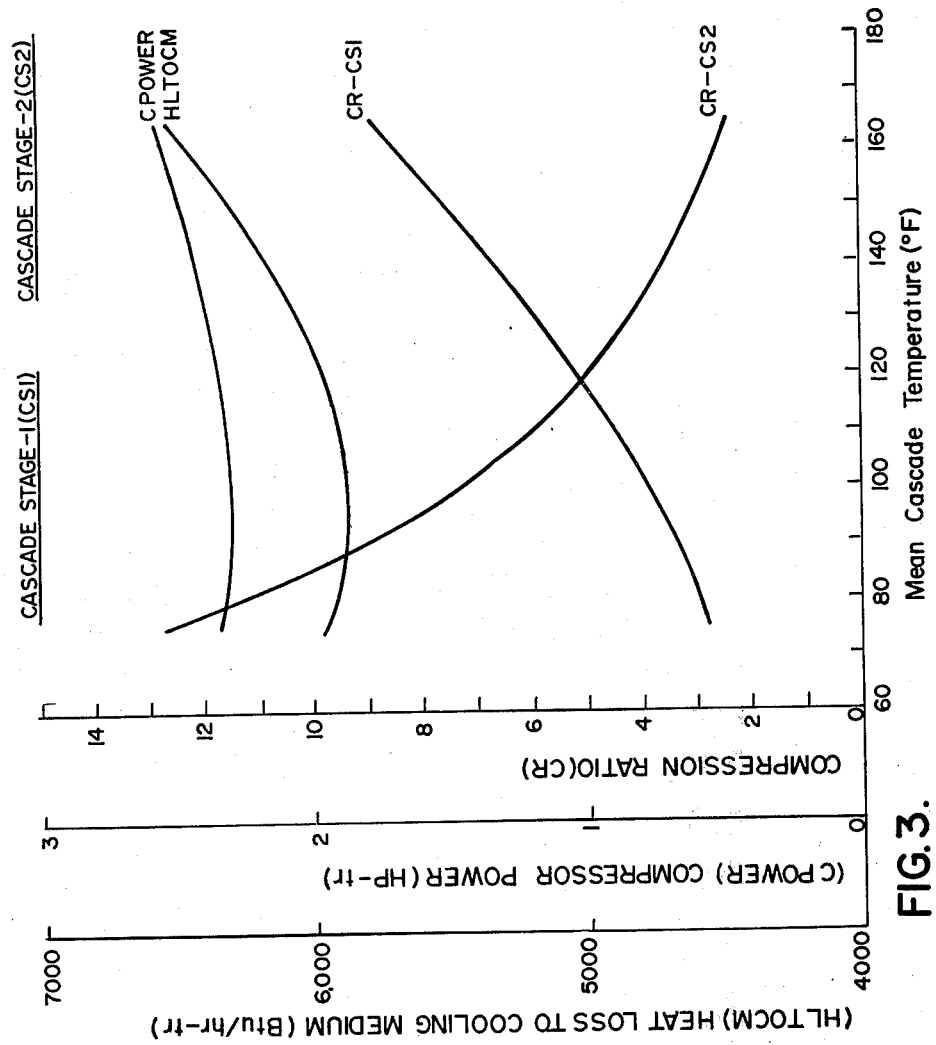

The present invention will be further illustrated by way of the accompanying drawings in which:

FIG. 1 is a cross-sectional diagramatic representation of an apparatus for use in the freeze-drying process of the present invention;

FIG. 2 is a flow diagram of an evacuation means according to one embodiment of the present invention for use in the freeze-drying process, one embodiment of which is shown in FIG. 1; and FIG. 3 is a graph showing the influence of mean cascade temperature on the performance of the cascade heat pump system comprising of second and third heat pump means. Referring firstly to FIG. 1, the drying chamber 51 comprises a cylindrical portion 2 and a conical portion 3 which are welded together to form a conical hopper. The chamber 51 is supported vertically by legs 4 and has a nozzle at the bottom of the hopper for accepting a demountable vacuum lock assembly 24 from which the freeze-dried product is withdrawn. The hopper is closed by a demountable head 1 to form the drying chamber 51. The vacuum drying chamber 51 includes vacuum-proof windows 13 which may serve for inspection or manholes and includes one or more nozzles 15 with demountable flanges which are used to introduce vapors and/or gases as a means to influence the process occuring in the chamber 51. These nozzles 15 may also be used for introducing infrared or microwave energy in which case the chamber 51 would act as a microwave or infrared oven operating under vacuum in which the particles freeze-dry while they are in suspension. The chamber 51 is provided with one or more nozzles 25 through which water vapor and gases are removed from the chamber 51 and their positioning in the chamber 51 near the top allows an overall vertically upward flow of vapors surrounding the particulate material and in so doing aids in the suspension of the particles in the chamber 51. The nozzle 25 instead of being welded on to the head as shown may alternatively be welded to one or more annular or partly annular vacuum ducts which may be used to exhaust the vapors and gases from the drying chamber 51.

The angle alpha ($\alpha°$) of the conical portion 3 depends upon the flow characteristics of the product and is small enough to provide a slope compatible with an easy flow of material. The head 1 of the drying chamber has an opening in the flange 18 welded to it, the opening being made large enough to function as a manhole if there should be a need. This opening is closed by flange 17 which in turn has an opening to allow entry to an atomization system mounted on flange 16. The demountable flanges 16 and 17 provide a means for supporting the atomization system designed for operation compatible with the vacuum conditions prevailing in the drying chamber. This atomization system is shown as a centrifugal disc atomization system. Adapter 19 allows an externally mounted electric motor 21 to drive the disc 20 of the centrifugal disc atomization system. The adapter 19 also serves to bring in feed of aqueous atomizable material to the disc 20 by way of feed line 23. The electric motor 21 is supported in bracket 22. It is within the scope of the present invention to use any other means of prime mover to operate the centrifugal disc atomizer or even employ under some conditions pressure nozzles or any other means for atomization. The choice of whether to use one or more atomization devices and their placement in relation to the drying chamber is governed by the size of the chamber 51 and the particular conditions in the chamber 51. In some cases, it may be advantageous to install pressure nozzles near the bottom end and spray in an upward direction. The drying chamber 51 is provided with a heat exchanger 5 and heating medium is brought to the heat exchanger by way of conduit 9. Heating medium inlet coupling 8 provides a vacuum-proof connection between the conduit 9 and conduit 7, the latter serving to bring the heating medium to the distribution header 6. After adequately traversing the heat exchanger 5 the heating medium leaves the heat exchanger 5 by way of conduit 10, heating medium exit coupling 11 providing a vacuum-proof connection between the conduit 10 and conduit 12. The conduit 12 serves to carry the heating medium from the chamber for future use e.g. return to the third heat pump means of evacuation means as will be explained hereinafter. Also the conical portion 3 of the chamber 51 may be similarly heated if desired.

The atomizable substance, e.g. the coffee extract, suitably at a concentration of 40 to 50%, after receiving any required pretreatment is fed to the chamber 51 by way of feed line 23 which on reaching the spinning disc 20 of the centrifugal disc atomization system is atomized. The atomized material freezes almost instantly due to prevailing vacuum conditions compatible with freeze-drying and the frozen particles that remain in the drying chamber dry to the desired moisture content while they are still in suspension and settling. Particles that leave the drying chamber through outlet 25 with water vapor are led to the separation equipment 50, such as a cyclone separator, wherein these smaller particles are separated from the vapors and are subsequently dried to the desired moisture content, the separator being also provided with the necessary heat for drying by means of the third refrigerant from the third heat pump means of the evacuation means.

The larger particles separated in the drying chamber 51 and the small particles separated in the separator 50 settle down into respective shallow fluidized bed zones and these particles leave the respective chambers 51 and 50 through suitable vacuum lock means into a product handling system.

From the vapors that leave the separator 50 a portion may be bled for recirculation to the chamber 51 and/or the separator 50 and the remaining vapors are led via vacuum line 101 as shown in FIG. 2 through valve 102 to an absorber 100.

Referring to FIG. 2 the absorption of water vapor is accomplished in abosrber 100 by a suitable absorbent medium such as a chilled aqueous solution of lithium bromide. The absorbent medium is maintained at the desired temperature by recirculating it through an abosrbent chiller 109 and is maintained at the desired concentration by regeneration of the absorbent medium in evaporator 130. The control of the temperature and concentration of the absorbent medium serves the purpose of maintaining a sufficiently low vapor pressure in the absorber 100 in order to overcome the resistance of the vacuum line 101 to the flow of vapors between the drying chamber 51 and the absorber 100. Thus the temperature and concentration of the absorbent medium serves as an external means to control the vapor pressure in the drying chamber 51. In the freeze-drying system of the present invention, the vapor pressure in the drying chamber 51 is advantageously kept compatible for convective heat transfer with maintaining a vapor pressure on the particle surface at least equal to the optimum vapor pressure based on the residence height if this condition does not conflict with the constraints placed by the material to be freeze-dried. For the case of convective heat transfer to the particles, the vapor pressure on the particle surface should be 1,800 millitorrs or more for 250 micron particles, but for small particles of 100 to 200 micron the vapor pressure is not so critical and may be between 1,500 and 4,000 millitorrs. A vapor pressure of 500 millitorrs in the absorber 100 is consequently adequately low and can be expeditiously maintained by chilling the lithium bromide solution to about 0°C. A chart giving the vapor pressure-temperature-concentration data on aqueous lithium bromide solution in available in ASHRAE Guide & Data Book, 1965 edition, p. 15.

The water vapor coming from the drying and separation chambers by way of vacuum line 101 passes through vacuum valve 102 and enters absorber 100 where it is subsequently uniformly disctioted and absorbed by spray 103 of the chilled concentrated absorbent medium. Although the absorber 100 in FIG. 2 is shown as a spray tower it may be any type of absorption equipment compatible with the overall process.

Pump 108 draws in a mixture of concentrated absorbent solution returning from evaporator 130 through valves 125 and 126 and a dilute absorbent medium from the absorber 100 through valve 104, pump 105 and valve 106. Mixing has previously occurred in the mixing valve 107 in the desired proportions. The absorbent medium returning from evaporator 130 is circulated by pump 123 through flow control valve 122 and check valve 124 on its way to the mixing valve 107. The rate of flow of absorbent medium through chiller 109 is preferably kept stable at an optimum design value. The pump 108 forces the absorbent medium through the tubes of the absorbent chiller 109 in which a refrigerant (second refrigerant) is evaporating on the shell side. The chilled concentrated absorbent medium is then passed through line 110 and is suitably distributed and dispersed in the absorber 100 in order to effect optimum rate of generation of absorption area per unit volume. The water vapor is thereby absorbed and as a result the absorbent medium becomes diluted and heated. Some heated and diluted absorbent medium is withdrawn at a suitable rate through the proportioning control valve 104 in order to pumped by the pump 105 into the mixing valve 107 in which it mixes with the concentrated absorbent medium returning from the evaporator 130. The mixture is then returned to the absorber 100 after being chilled in the chiller 109 in order to repeat the cycle.

A large portion of the heated and diluted absorbent medium, corresponding to the difference between (a) the rate at which absorbent medium is supplied to the absorber 100 plus the rate of absorption of water vapor therein, and (b) the rate at which a portion leaves the absorber 100 through valve 104, is withdrawn from the absorber 100 through valve 111 by means of pump 112. On its way to the evaporator 130 this dilute absorbent medium passes via a check valve 113 through a heat exchanger 114 in which it gains heat from the concentrated absorbent medium returning from the evaporator 130. As a result of this exchange, the concentrated absorbent medium is cooled while the dilute absorbent medium is heated. This heat exchange therefore helps reducing the mechanical energy requirements during the subsequent reconcentration as well as chilling operations. From this heat exchanger 114, the partially heated dilute absorbent medium follows a line leading it through check valve 115 to a mixing valve 116 and in this mixing valve the absorbent medium coming from the absorber 100 mixes with the absorbent medium recirculated by pump 120 as explained hereinafter, and from the mixing valve 116 the abosrbent medium passes through line 117 to evaporator 130.

The evaporator 130 although shown as an agitated falling film shell and tube type evaporator may be of any other design compatible with the overall process. The absorbent medium entering the evaporator 130 is uniformly distrubuted and descends in thin films on the inside of the tubes 118 exchanging heat with the refrigerant of a heat pump system (first heat pump means) condensing on the shell side 176 of the evaporator 130 at a suitable temperature for example about 104°C. Some of the water contained in the concentrating absorbent medium is thereby evaporated at a vapor pressure of about 120 torrs and a concentrated absorbent medium collects in evaporator sump 129. In order to maintain steady state operating conditons the concentrated absorbent medium is returned to the mixing valve 107 at the same rate as it is withdrawn from the absorber 100 by pump 112 for supplying it to the evaporator 130 less the rate of evaporation in said evaporator. This returning concentrated absorbent solution is cooled on the way in heat exchanger 114 as explained heretofore.

To aid in the concentration of the absorbent medium it may be desirable to recirculate the absorbent medium through the evaporator tubes 118. In order to accomplish this, a portion of the absorbent medium is continuously withdrawn from the evaporator sump 129 through valve 119 by means of pump 120. This pump sends it through check valve 121 to the mixing valve 116 where it mixes with the dilute abosrbent solution coming from the absorber 10o via heat exchanger 114 as explained heretofore.

The water vapor evolved from the concentrating absorbent medium leaves the evaporator 130 by way of line 189 and is led to a cascade condenser 190 which although illustrated as a vertical shell and tube condenser could be of any other design compatible with the overall process. In this cascade condenser 190 the incoming water vapor condenses on the tube side at a temperature of about 55°C governed by thermodynamic considerations. The condensing water vapor loses heat to a refrigerant (first refrigerant) evaporating on the shell side at a suitable temperature in order to maintain the desired condensation temperature on the tube side. A heat pump system (first heat pump means) uses the vapor of the evaporating first refrigerant for supplying the compressed first refrigerant vapor to the evaporator 130 where it condenses on the shell side in order to provide the heat necessary for concentrating the absorbent medium. The condensed water is removed from the cascade condenser 190 by means of pump 193 through trap 192 and is discharged along the line 194. This condensate represents a potential source of available heat which can be used to supply process heat wherever needed.

The water vapor condensing for example at 55°C on the tube side of the cascade condenser 190 serves as a heat source for the first refrigerant evaporating on the shell side, and the absorbent medium concentrating on the tube side in the evaporator 130 serves as a heat sink for the compressed first refrigerant vapor condensing for example at 104°C on the shell side of the evaporator 130. A heat pump system (first heat pump means) couples together the cascade condenser 190 (which serves as the water vapor condenser and as the evaporator of first heat pump means) and the absorbent evaporator 130 (condenses of the first heat pump means). The liquid line 177 to subcooler 178 where it loses heat to a cooling medium which may be an external heat sink such as cooling water or some other medium which needs to be heated and is thereby subcooled. The liquid refrigerant then passes through liquid line 179 and is further subcooled in passing through liquid-vapor suction line heat exchanger 172 which ensures an adequate superheating of the suction vapor. The sequence of subcooling in cooling medium subcooler 178 and in the liquid-vapor suction line heat exchanger 172 may be interchanged if so required by the prevailing temperature conditions or some other thermodynamic considerations. The subcooled liquid refrigerant passes along liquid line 180, is then expanded by an expansion valve 181 and enters the cascade condenser (evaporator of the first heat pump means) 190 on the shell side by way of line 182. The first refrigerant vapor leaves the cascade condenser 190 by way of suction line 170. At this stage a portion of the suction vapor is bled by means of proportioning bypass control valve 184. The unbled fraction of suction vapor follows suction line 171 and after sufficient superheating in passing through the liquid-vapor suction line heat exchanger 172 follows the suction line 173 to heat pump compressor 174. After compression the refrigerant vapor is discharged along line 175 and the compressed refrigerant vapor condenses on the shell side of the evaporator 130. Size of the bled fraction of the suction vapor is controlled by the proportioning bypass control valve 184 to allow sufficient unbled suction vapor to be compressed by the heat pump compressor 174 in order to meet the heat requirements in the evaporator 130 at all times. The bled fraction is liquified in passing through a condenser 185 by losing heat to a cooling medium which may be an external heat sink such as cooling water. The resultant liquid refrigerant is then returned by pump 186 through check valve 187 and expanded by expansion valve 188 into the shell side of cascade condenser 190 where it evaporates together with liquid refrigerant returning from evaporator 130.

The absorbent medium to be chilled in chiller 109 serves as the heat source for a heat pump system that delivers heat to the freeze-drying material or wherever required in the freeze-drying process at a proper rate.

The absorbent refrigeration system (second heat pump means) is designed to chill the absorbent medium to a proper temperature, for example 0°C in order to maintain a water vapor pressure of about 500 millitorrs in the absorber 100. Indeed a temperature to which the absorbent medium needs to be chilled depends upon the thermodynamic considerations of the absorption-regeneration process and the water vapor partial pressure to maintained in the drying chamber of the system among other things. The liquid second refrigerant after having been subcooled in liquid-vapor suction line heat exchangers 142 and 142B is expanded on the shell side of the shell and tube absorbent chiller 109. This expanded refrigerant evaporates on the shell side by receiving heat from the absorbent medium being chilled and leaves the absorbent chiller 109 as a vapor by way of suction line 140. A controlled fraction of the suction vapor required to bypass the main compressor 144 is bled by proportioning bypass valve 141 while the remaining suction vapor goes to the main compressor 144 by way of suction line 143. On its way to the main compressor the vapor passes through liquid-vapor suction line heat exchanger 142 where it is superheated thereby causing a subcooling of the liquid refrigerant. The control system is designed to ensure a desired degree of superheating of the suction vapor depending upon the refrigerant characteristics. The suction vapor compressed by the main compressor 144 then follows the discharge line 145 and is led to the cascade heat exchanger 146 where it condenses on the shell side (serving as heat source for third heat pump means) by losing heat to the third refrigerant evaporating on the tube side. The evaporating third refrigerant is later compressed by a heat pump system (third heat pump means) for providing the heat required in freeze-drying process or elsewhere. The second refrigerant condensed on the shell side of the cascade heat exchanger 146 is passed through line 147 to reach expansion valve 148 and is subcooled in the liquid-vapor suction line heat exchanger 142. On its way it may be preferably subcooled in a heat exchanger (not shown) by losing heat to an external heat sink such as cooling water. Depending upon the prevailing temperature conditions and some other thermodynamic considerations, the sequence of subcooling by means of cooling water and in the liquid-vapor suction line heat exchanger 142 may be interchanged. After subcooling, the liquid refrigerant is expanded on the shell side of the chiller 109 wherein it evaporates and leaves by way of suction line 140.

The fraction of suction vapor bled by the proportioning bypass control valve 141 is likewise superheated in liquid-vapor suction line heat exchanger 142B and passed along suction line 143B for compression by means of a booster compressor 144B. This compressed refrigerant vapor leaves the booster compressor 144B by way of discharge line 145B and is condensed in condenser 146B by losing heat to an external heat sink such as cooling water. On its way to the expansion valve 148B by way of liquid line 147B the liquid refrigerant is subcooled in the liquid-vapor suction line heat exchanger 142B which also ensures an adequate superheating of the suction vapor compressed by the booster compressor 144B. The expansion 148B expands this subcooled liquid refrigerant on the shell side of the chiller 109 where it evaporates together with liquid refrigerant returning from the cascade heat exchanger 146.

The temperature and concentration of the chilled absorbent solution leaving the chiller 109 through line 110 and its rate of recirculation are suitably controlled by properly interlinked control means in order to maintain the desired vacuum in the drying system while avoiding any problems of absorbent medium freeze-up.

The condensation and evaporation temperatures in cascade heat exchanger 146 should be maintained at levels permitting an optimum performance. This optimum condensation and evaporation temperatures depend upon thermodynamic considerations and the condensation temperature may turn out to be higher than needed for the external heat sink such as cooling water. This eventuality is highly probable in a cascade heat pump (comprising of the second and third heat pump means), employing for example Freon 12 in the first cascade stage (the second heat pump means) and Freon 113 in the second cascade stage (the third heat pump means), with a suction saturation temperature of the refrigerant vapor in first cascade stage equal to −6.5°C (20.38°F) and the discharge saturation temperature of the refrigerant vapor in second cascade stage being equal to 104°C (218.80°F) and for a cooling water temperature of 27°C, cascade temperature difference of about 5°C, a terminal difference of at least 5°C, and various isentropic efficiencies. The results for 80 % efficiency are shown in FIG. 3 where the compression ratio of cascade stages, the total mechanical power required to drive the compressors and the required rate of heat dissipation to the cooling water are plotted against the mean cascade temperature. From refrigeration engineering and thermodynamic considerations it is obvious that a mean cascade temperature of about 50°C is compatible with the optimum performance which indeed is a much higher temperature than the temperature level of 32°–38°C which can be maintained by the natural cooling medium (cooling water) at 27°C. In such cases the heat pump compressor 144 and the booster compressor 144B are both needed to increase the efficiency and power economy. Moreover, if one is willing to sacrifice the thermodynamic gains coming from the use of the heat pump compressor 144 as well as the booster compressor 144B, it is possible to compress in the heat pump compressor 144 all the low pressure refrigerant vapor coming from the absorbent chiller 109 and then bleed the compressed refrigerant vapor rather than the low pressure vapor at a properly controlled rate for condensing it by losing heat to an external heat sink such as cooling water. This liquid refrigerant formed by condensing the compressed bled vapor is subsequently returned to the shell side of the absorbent chiller 109 in the same manner as for the liquid refrigerant formed by condensing the bled suction vapor after compression in the booster compressor 144B. The remaining compressed vapor as in the previous case condenses on the shell side of the cascade heat exchanger 146.

The evaporating third refrigerant in the cascade heat exchanger 146 gains heat from the compressed second refrigerant vapor of the second heat pump means condensing on the shell side of the cascade heat exchanger 146. The condensing second and the evaporating third refrigerants in the cascade heat exchanger 146 are different when the thermodynamic or mechanical reasons so demand. The vapor of the evaporating third refrigerant leaves the cascade heat exchanger by way of suction line 150 and a properly controlled portion of this suction vapor may be bled by means of proportioning bypass valve 184A while the remaining vapor passes along suction line 151 through a liquid vapor suction line heat exchanger 152 where it gains heat from returning subcooled liquid third refrigerant. The suction vapor is superheated to the desired level and led, via suction line 153, to the compressor 154, the compressed refrigerant vapor is led from the compressor 154 by discharge line 155 to the heat exchanger means of the freeze-drying system where it condenses at the desired temperature, for example 100°–150°C, to provide heat in the freeze-drying chamber and/or the separation equipment, and the condensate still at high temperature may be further used to supply process heat whereby it is subcooled (first stage subcooling). This partially subcooled liquid refrigerant passes along liquid line 160 and is further subcooled (second stage subcooling) in a cooling medium subcooler 161 by losing heat to an external heat sink such as cooling water. The refrigerant in liquid line 162 is subsequently subcooled again (third stage subcooling) in liquid-vapor suction line heat exchanger 152, and depending upon the prevailing temperature conditions and some other thermodynamic considerations the sequence of subcooling in liquid-vapor suction line heat exchanger 152 and in cooling medium subcooler 161 may be interchanged or one or more of the first and second stages of subcooling may be eliminated. The liquid third refrigerant is subsequently expanded by expansion valve 163 on the tube side of the cascade heat exchanger 146 where it evaporates by gaining heat from second refrigerant vapor compressed by the compressor 144 of the second heat pump means condensing on the shell side of the cascade heat exchanger 146.

Under steady state conditions, the proportioning bypass valve 141 would bleed just the right quantity of low pressure second refrigerant vapor coming by way of suction line 140 to leave a sufficient quantity of refrigerant vapor for compression by the compressor 144 of the second heat pump means in order to provide an adequate heat source to the third heat pump means.

When the saturation temperature of the low pressure suction vapor of third refrigerant leaving cascade heat exchanger 146 is greater than the temperature of the external heat sink, e.g. cooling water, it is sometimes simpler although less advantageous in the thermodynamic sense to adapt the following alternative scheme of balancing the thermal needs of the system. The portion of the low pressure suction vapor leaving the cascade heat exchanger 146 is allowed to bypass the compressor 154 of the third heat pump means. The bypassed portion is controlled by a proportioning bypass valve 184A and is condensed by exchanging heat in a condenser 185A with an external heat sink (cooling water). The resulting liquid refrigerant is then returned by a pump 186A through check valve 187A and expanded by expansion valve 188A on the tube side of the cascade heat exchanger 146 where it evaporates together with the liquid refrigerant returning from the heat exchanger means and expanded by expansion valve 163.

Under steady state operating conditions the partial pressure of noncondensible gases in the freeze-drying system is maintained at a desired level by means of a purge unit 197 which pumps the noncondensible gases from the absorber 100, evaporator 130, and cascade condenser 190 via lines 195 and 196. In operation, the pressure in the drying chamber is lowered by purging the noncondensible gases by means of pump 197 through line 101 and recirculating the absorbent medium through absorber 100 and when the desired low pressure has been achieved the valve 102 in the line 101 is adjusted to provide the necessary pressure differential between the chamber 51 and the absorber 100.

It will be noted that in the freeze-drying system of the present invention including the refrigeration and heat pump system there is no need for an external heat source. It has also reduced the need for a natural heat sink (e.g. cooling water) to the minimal quantity required for the condenser 146B used for condensing the bled second refrigerant vapor compressed by the booster compressor 144B of the absorbent refrigeration system. The small quantity of cooling water required by comparison with the conventional freeze-drying system is responsible for savings in circulation pumps and cooling towers, etc. Furthermore the condensers such as 185 and 185A, the subcoolers such as 161 and 178, and the condensate leaving the cascade condenser 190 at 194 are good and sizable sources of available heat.

While the process of the present invention is primarily a freeze-drying process, it will be realized that in the chamber 51 whether freeze-drying occurs in a particular situation is a matter of pressure level of the vapors surrounding the drying material and the process of the present invention is also applicable to vacuum drying including concentration of the material by partial removal of liquid phase.

When the drying system of the present invention is used in a vacuum drying process other than in a freeze-drying process, the water vapor pressure in the absorber 100 is above the triple point pressure so that the water vapor extracted from the chamber 51 condenses in the liquid phase rather than in the solid phase when contacted with chilled water, and consequently the water vapor may be condensed in the absorber 100 by means of a spray of chilled water which is continuously chilled by being circulated through chiller 109 by means of pump 105. As the evaporation of the absorbent medium (chilled water in this case) becomes superfluous the valve 111 would be fully closed and the evaporator 130 and condenser 190 and their associated heat pump system (first heat pump means) is superfluous. From the chilled water being removed from absorber 100 by pump 105 a portion equivalent to the amount of water vapor condensed into it is removed, preferably before it reaches the chiller 109, in order to ensure steady state operation.

The present invention thus includes an evacuation means for continuously removing vapor from a drying chamber maintained at a subatmospheric pressure, the vapor pressure in the drying chamber being maintained above the triple point pressure of the substance of the vapor, as said vapor is generated in said chamber in the vacuum drying of a material, said evacuation means comprising an absorber through which liquid of said vapor is continuously passed; said liquid being at a sufficiently low temperature to provide in said absorber a vapor pressure substantially lower than in said chamber but yet above the said triple point pressure whereby to cause vapor to rapidly pass from said chamber to said absorber where it is condensed in said liquid; a chiller adapted to cool the heated liquid from the absorber to the desired temperature for said absorber, by heat exchange with evaporating second refrigerant, for passage to said absorber; and a means for continuously removing said liquid at a rate corresponding to that at which the said vapor is condensed in said absorber in order to maintain a steady state condition.

The present invention thus also provides a continuous vacuum drying system substantially eliminating the need to supply heat from an external heat source for vacuum drying a material, which system comprises a drying chamber maintained at subatmospheric pressure, a means for passing said material through said chamber, a heat exchange means for supplying heat to said material in said chamber by means of a heat pump system to cause vaporization of at least a portion of the liquid in the said material, and an evacuation means for continuously withdrawing vapor from said chamber and condensing said vapor by bringing it in contact with a liquid of said vapor which liquid then becomes heat source for a heat pump system (the second heat pump means) used in my system for supplying heat to said material.

It should be recognized that under the usual operating conditions, some noncondensible gases do leak into the vacuum system and further that in vacuum drying/freeze-drying some noncondensible gases are also evolved from the material being dried. Thus the term vapor or water vapor used in this disclosure should be interpreted to also include, wherever feasible, the noncondensible gases associated or mixed with said vapor or water vapor.

The economic advantages of the freeze-drying system of my present invention as compared with the most acceptable type of conventional freeze-drying system in commercial use at the present time, namely one employing central utility services and multicabinet installation with removable cars, are inter alia: savings of up to about 35 % are feasible in the investment on utility equipment, mechanical energy requirements are reduced by an amount up to about 70 %, the cooling tower capacity requirements are reduced by an amount up to about 80 %, the need for supplying sublimation heat is substantially completely eliminated. There are environmental benefits due to reduced pollution and conservation of energy resources. The cost of freeze-drying by the process of the freeze-drying system of the present invention is estimated to be of the order of 15 % as compared with the cost of freeze-drying by the process of conventional freeze-drying systems, on the basis of water removed — freeze-drying costs will be still lower on the basis of freeze-dried product because in the freeze-drying system of the present invention material with higher solids concentration can be freeze-dried without difficulty or problems of sticking etc.

Some of the additional advantages of the freeze-drying system of the present invention over the conventional freeze-drying systems are given below:

a. A higher throughput is possible for a given physical size of the plant and floor space due to the continuity of the operation, particularly when atomization embodiment of my freeze-drying system is employed.

b. The continuous evacuation means of the freeze-drying system of my present invention eliminates the down time usually necessitated by frosting and defrosting operations usually associated with conventional surface condensers and also eliminates considerable losses of thermal and mechanical energy required for defrosting and subsequently recooling of the conventional condensing surfaces up to the required low temperature. The energy thus saved becomes more significant as the frosting and defrosting cycle of conventional surface condensers is made shorter in order to save down time.

c. In the conventional freeze-drying plants the drying chamber and other parts and equipment inside the said chamber have to be cooled down to approximately the temperature of the frozen substance. Subsequently they have to be heated from this low temperature to a high temperature in order to provide heat for sublimation. Depending upon the heat capacity of the chamber and its interior equipment, the mechanical and thermal energy wasted in this inevitable cooling and heating of the chamber and interior equipment can be quite significant. It is indeed of the same order of magnitude as the energy usefully employed in the freeze-drying of material itself. Such a waste of energy and also of time is almost completely eliminated by the freeze-drying system of the present invention.

d. Conventional freeze-drying plants in which the frozen material is transferred to a drying chamber require the freezers to operate at much lower temperatures than otherwise necessary in order to ensure that the temperature of the frozen mass will remain below the minimum temperature of incipient melting before proper freeze-drying conditions, e.g. vacuum, etc., can be established in the drying chamber. A temperature allowance of at least 10°C has to made to counterbalance the temperature rise of the frozen material during its transportation to the drying chamber and during the loading operations. This need for a lower temperature increases the refrigeration requirements and the power per ton of refrigeration. For example a 5°C decrease in temperature of frozen material will necessitate a power increase of about 15–20 % per ton of refrigeration while the refrigeration load itself will also increase. Moreover, the refrigeration capacity per cubic foot per minute of compressor displacement decrease by about 20–25 %. The overall effect for a 5°C decrease in temperature thus amounts to some 20–30 % increase in mechanical energy required and some 20– 25 % increase in the size of the refrigeration equipment. In the freeze-drying system of the present invention there is no refrigeration requirement for freezing the product. With the product frozen outside the drying chamber there is also a danger of its temperature rising above the minimum temperature of incipient melting before a good vacuum can be established in the drying chamber. Thus there is a need for an oversized evacuation system in the conventional freeze-drying plants.

e. The freeze-drying system of the present invention, because of lower freeze-drying costs, makes it feasible to freeze-dry foods and other materials of relatively low commercial value.

The present invention will be further illustrated by way of the following Examples.

EXAMPLES

A freeze-drying chamber as set forth in FIG. 1 with a diameter of 6 feet was provided with a longitudinally embossed panelcoil heat exchanger leaving a free space of about 5.6 feet diameter. The outlet 25 was connected to a regular surface condenser backed with a mechanical vacuum pump for removing water vapor and other noncondensible gases from the chamber. The atomization was effected by a centrifugal disc atomization system with a 2 inch diameter atomizer disc of a "MINOR" centrifugal disc atomizer of NIRO Atomizer Company being driven by a variable speed electric motor. The purpose of the Examples is to show the utility of the atomization embodiment of the freeze-drying system of this invention.

a. Coffee extract is a difficult material to be freeze-dried especially at high concentration of solids partly because of the high resistance to mass transfer offerred by the dry layer and the very low permeability of the surface layer that forms on the surface of the product, and partly because difficulties with sticking and performance are encountered in the conventional freeze-drying systems (for example, see: British Pat. No. 1,086,251, p. 6, lines 1–10) if the solids content of the coffee extract liquid to be freeze-dried reaches 25 % by weight. Freeze-drying coffee extract requires very low vapor pressure to be maintained in the drying chamber of conventional freeze-drying systems, and with such a material the spray freeze-drying system of FMC Corporation as disclosed in British Pat. No. 1,086,251 and U.S. Pat. No. 3,362,835, in which the drying material is supported on a vibrating pan in the drying chamber, would not operate at vapor pressures exceeding 350 millitorrs in the drying chamber. The purpose of this Example was therefore to investigate if high concentration coffee extracts could be freeze-dried in the atomization embodiment of the present invention in which particles are dried while in suspension in the drying chamber, while operating at high vapor pressure in the drying chamber which offers many process and economic advantages.

Coffee extract containing about 50 % coffee solids was freeze-dried at an average pressure of about 1,500 millitorrs in the drying chamber and the disc of the atomization system was spinning at about 8,000 RPM and the refrigeration control for the surface condenser was set at −40°C. After drying, the vacuum in the apparatus was broken with room air and the moisture content of the dried powder was measured by employing a Cenco Moisture Balance with the infrared lamp output set at 100 watts. The average moisture content of the dried powder was about 1.2 % and it slowly absorbed moisture during exposure to room atmosphere. The coffee powder was free-flowing, of a desirable dark color, and the particles did not stick to each other but seemed to be hygroscopic. The reconstitution in cold water was fast and complete and the aroma of the reconstituted coffee was as good as obtained from the original coffee extract.

b. The purpose of this Example was to study the ascorbic acid (vitamin C) retention in an imitation freeze-dried orange juice. The dry mix of the following composition:

| Components of the dry mix | Parts |
| --- | --- |
| Sugar (extra fine sucrose) | 91.00 |
| Citric acid | 6.00 |
| Sodium citrate | 1.40 |
| Ascorbic acid (vitamin C) | 0.20 |
| Tricalcium phosphate | 0.40 |
| Pectin (150 Grade, rapid set) | 0.50 |
| Dry orange flavor (Permastabil) | 0.50 |
| | 100.00 | was dissolved in a ratio 1 part of solids to 3.5 parts of water (w/w) i.e. equivalent to about twice the normal concentration of solids in orange juice. The solution was freeze-dried as in Example (a) at a pressure of about 1,500 millitorrs in the drying chamber and the atomizer disc spinning at speed varying between 9,000 and 18,000 RPM was used for atomization. The refrigeration control for the surface condenser was set at −40°C. After the drying operation, the vacuum in the apparatus was broken with room air, the powder was filled into a brown glass bottle and stored in cold room at a temperature between 0° and 2°C along with the original dry mix similarly bottled. The ascorbic acid content was assayed by indophenol-xylene method as described by Freed (1966) Methods of Vitamin Assay, 3rd edition, pp. 306–312, prepared and edited by the Association of Vitamin Chemists, Inc., Inter-Science Publishers. The original dry mix and the freeze-dried powder was dissolved in cold water in the ratio of 1 to 7 weight per weight for studying the reconstitution behaviour. The powder which had not contacted hot surfaces of the heat exchanger was sugar-white in color similar to the original dry mix. During collection, however, it was contaminated with some brown material which had contacted the heat exchanger. The powder was hygroscopic and absorbed moisture from the atmosphere. The powder packed in moisture-proof containers remained free-flowing and the reconstitution of power with cold water was fast and complete. The ascorbic acid content of the original dry mix was found to be 0.21 %, the ascorbic acid content of freeze-dried powder was 0.204 %, the retention through freeze-drying was then 97 % which represents good protection of ascorbic acid during freeze-drying in my apparatus.

c. The purpose of this experiment was to evaluate the effect of freeze-drying on an imitation grape flavor which is normally available as a liquid emulsion on a commercial basis. This product was chosen because it is found that during ordinary drying operation its typical flavor was significantly affected by heat. A dry mix composition was developed as set forth below:

| Components | Parts |
|---|---|
| Sugar | 94.00 |
| Sodium citrate | 0.50 |
| Tricalcium phosphate | 0.40 |
| d-Tartaric acid | 3.50 |
| Ascorbic acid (vitamin C) | 0.20 |
| Pectin Grade 150-R.S. | 0.50 |
| CMC 7 HOF | 0.70 |
| | 99.80 | after several preliminary tests and organoleptic evaluations of the resulting drink prepared by dissolving one part of dry mix with six parts of cold water weight by weight. The quantity of imitation grape flavour required to impart a desirable flavour to the drink amounted to a concentration of 125 ppm flavour solids. The imitation grape flavour in the liquid form was supplied by Stuart Brothers Limited, Flavour No. 20173. It had a specific gravity of about 1.1 and contained about 22% flavour solids by weight and it had a redish wine color. For freeze-drying, the liquid flavor was mixed with an aqueous solution of gum arabic, the quantity of 676 grams of gum arabic was dissolved in 1.75 liters of water. This aqueous solution was subsequently mixed with 2 liters of the original liquid flavor into an emulsion. Calculation showed that the resulting emulsion contained about 10.46% of flavor solids by weight. This emulsion was subsequently freeze-dried as in Example (a) at a pressure of 2000 to 3000 millitorrs in the drying chamber and the speed of the spinning disc was about 20,000 rpm, corresponding to a speed control setting to 45 % of maximum. The refrigeration control for the surface condenser was set at −40°C. After drying, the vacuum in the apparatus was broken with room air and the product was stored in brown glass bottles. The moisture content of the dried powder was measured by employing a Cenco moisture balance with the infrared lamp output set at 100 watts. The average moisture content of the powder was found to be 2.75 %, it was dark colored as the original flavor, it was free-flowing, and the particles did not stick together. The dried powder absorbed moisture on being exposed to the atmosphere. A quantity of 0.3 gram of freeze-dried powder was added to 300 grams of cold water in order to study its reconstitution characteristics. The particles sank to the bottom while dissolving by diffusive action. The reconstitution was fast and complete and did not require agitation. Mild rotation of the water however increased the rate of dissolution of freeze-dried powder in the cold water.

A few days later the freeze-dried flavor powder was compared to the original liquid flavor which was corrected for the gum arabic content of the freeze-dried flavor powder by adding equivalent quantities on a flavor solids basis of 125 PPM to a drink prepared by dissolving one part of dry mix in 6 parts of cold water weight by weight. The two drinks were evaluated on a hedonic scale by an untrained flavor panel in three separate sessions. The grape drinks prepared with the freeze-dried powder and with the original liquid flavor were similar with respect to color. The data obtained from the three separate flavor panels were pooled together and while the panelists rated the drink prepared with the freeze-dried flavor powder as superior to that prepared from the original liquid flavor, the difference was not significant at 95 % confidence level. In other words, the freeze-dried flavor powder was as good or better than the original liquid flavor, in imparting desirable flavor to the drinks flavored with them.

I claim:

1. A drying system for freeze-drying a material, said material comprising a substance to be removed in order to effect freeze-drying of said material, which system substantially eliminates the need to supply heat from an external heat source for freeze-drying said material; said system comprising in combination:

a. a drying chamber wherein is maintained a subatmospheric vapor pressure in order to effect freeze-drying of said material, b. a means for passing said material through said drying chamber for freeze-drying thereof during said passage, c. an evacuation means for continuously removing vapor from said drying chamber as it is generated in said chamber in the freeze-drying of said material, said evacuation means comprising a combination of coacting means including an absorber wherein the vapor of said substance is absorbed in a liquid absorbent medium passing therethrough, an evaporator in which the substance so absorbed is continuously evaporated from said absorbent medium by heat exchange with a condensing first refrigerant, a condenser in which the vapor of said substance evaporated from said absorbent medium in said evaporator is condensed by heat exchange with evaporating first refrigerant, a first heat pump means adapted for supplying heat recovered from vapor of said substance condensing in said condenser to said evaporator in order to maintain therein the evaporation of absorbed substance from said absorbent medium thereby eliminating the need to supply heat from an external heat source by compressing at least a portion of the vapor of said first refrigerant evaporating in said condenser and supplying the first refrigerant vapor so compressed to said evaporator wherein it condenses in order to maintain therein the aforesaid evaporation of said absorbed substance from said absorbent medium and by expanding condensed first refrigerant from said evaporator through an expansion valve into said condenser, said first heat pump means being equipped with a cooling means for removing excess heat from said first refrigerant in order to maintain heat balance in said evaporator and in said condenser, a chiller in which the absorbent medium passing therethrough is cooled to restore the absorbent medium to the proper temperature for said absorber for passage to said absorber, by heat exchange with an evaporating second refrigerant, a means to maintain the absorbent medium in circulation through said absorber, evaporator and chiller, a pipeline for passing said vapor from said evaporator to said condenser, and including a means to purge the noncondensible gases from the system, d. a second heat pump means adapted for supplying heat recovered from absorbent medium passing through said chiller to a heat exchange means for supplying heat to effect freeze-drying of said material in said drying chamber thereby eliminating the need to supply heat from an external heat source by compressing at least a portion of the vapor of said second refrigerant evaporating in said chiller and supplying the second refrigerant vapor so compressed to said heat exchange means wherein it condenses thereby supplying heat for effecting freeze-drying of said material and by expanding condensed second refrigerant from said heat exchange means through an expansion valve into said chiller, said second heat pump means including a cooling means for removing excess heat from said second refrigerant in order to maintain heat balance in said heat exchange means and in said chiller.

2. A system as claimed in claim 1 in which said heat exchange means comprises a combination of coacting means including:

a. a cascade heat exchanger in which compressed vapor of second refrigerant is condensed by heat exchange with an evaporating third refrigerant, b. a heat exchanger means in which a compressed third refrigerant vapor is condensed to supply heat for effecting freeze-drying of said material, c. a third heat pump means adapted to compress at least a portion of the vapor of said third refrigerant evaporating in said cascade heat exchanger, pass the third refrigerant vapor so compressed to said heat exchanger means and to pass condensed third refrigerant from said heat exchanger means through an expansion valve into said cascade heat exchanger, said third heat pump means including a cooling means for removing excess heat from said third refrigerant in order to maintain heat balance in said heat exchanger means and in said cascade heat exchanger.

3. A drying system for vacuum drying a material, said material comprising a substance to be removed in order to effect vacuum drying of said material, which system substantially eliminates the need to supply heat from an external heat source for vacuum drying said material; said system comprising in combination:

a. a drying chamber wherein is maintained a subatmospheric pressure in order to effect vacuum drying of said material, b. a means for passing said material through said drying chamber for vacuum drying thereof during said passage, c. an evacuation means for continuously removing vapor from said drying chamber as it is generated in said chamber in vacuum drying of said material, said evacuation means comprising a combination of coacting means including an absorber wherein the vapor said substance is absorbed in a liquid absorbent medium passing therethrough, an evaporator in which the substance so absorbed is continuously evaporated from said absorbent medium by heat exchange with a condensing first refrigerant, a condenser in which the vapor of said substance evaporated from said absorbent medium in said evaporator in condensed by heat exchange with evaporating first refrigerant, a first heat pump means adapted for supplying heat recovered from vapor of said substance condensing in said condenser to said evaporator in order to maintain therein the evaporation of absorbed substance from said absorbent medium thereby eliminating the need to supply heat from an external heat source by compressing at least a portion of the vapor of said first refrigerant evaporating in said condenser and supplying the first refrigerant vapor so compressed to said evaporator wherein it condenses in order to maintain therein the aforesaid evaporation of said absorbed substance from said absorbent medium and by expanding condensed first refrigerant from said evaporator through an expansion valve into said condenser, said first heat pump means being equipped with a cooling means for removing excess heat from said first refrigerant in order to maintain heat balance in said evaporator and in said condenser, a chiller in which the absorbent medium passing therethrough is cooled to restore the absorbent medium to the proper temperature for said absorber for passage to said absorber by heat exchange with an evaporating second refrigerant, a means for maintaining the absorbent medium in circulation through said absorber, evaporator and chiller, a pipeline for passing said vapor from said evaporator to said condenser, and including a means to purge the noncondensible gases from the system, d. a second heat pump means adapted for supplying heat recovered from absorbent medium passing through said chiller to a heat exchange means for supplying heat to effect vacuum drying of said material in said drying chamber thereby eliminating the need to supply heat from an external heat source by compressing at least a portion of the vapor of said second refrigerant evaporating in said chiller and supplying the second refrigerant vapor so compressed to said heat exchange means wherein it condenses thereby supplying heat for effecting vacuum drying of said material and by expanding condensed second refrigerant from said heat exchange means through an expansion valve into said chiller, said second heat pump means including a cooling means for removing excess heat from said second refrigerant in order to maintain heat balance in said heat exchange means and in said chiller.

4. A system as claimed in claim 3 in which said heat exchange means comprises a combination of coacting means including:
   a. a cascade heat exchanger in which compressed vapor of second refrigerant is condensed by heat exchange with an evaporating third refrigerant,
   b. a heat exchanger means in which compressed third refrigerant vapor is condensed to supply heat for effecting vacuum drying of said material,
   c. a third heat pump means adapted to compress at least a portion of the vapor of said third refrigerant evaporating in said cascade heat exchanger, pass the third refrigerant vapor so compressed to said heat exchanger means and to pass condensed third refrigerant from said heat exchanger means through an expansion valve into said cascade heat exchanger, said third heat pump means including a cooling means for removing excess heat from said third refrigerant in order to maintain heat balance in said heat exchanger means and in said cascade heat exchanger.

5. A system as claimed in claim 3 in which a vapor pressure below the triple point pressure of said substance to be removed is maintained in said drying chamber to effect freeze-drying of said material.

6. A drying system for vacuum drying of a material, said material comprising a substance to be removed in order to effect vacuum drying of said material, which system substantially eliminates the need to supply heat from an external heat source for vacuum drying said material; said system comprising in combination:
   a. a drying chamber wherein is maintained a subatmospheric pressure, the vapor pressure in the drying chamber being maintained above the triple point pressure of substance to be removed in order to effect vacuum drying of said material,
   b. a means for passing said material through said drying chamber for vacuum drying thereof during said passage,
   c. an evacuation means for continuously removing vapor from said drying chamber as it is generated in said chamber in the vacuum drying of said material, said evacuation means comprising a combination of coacting means including an absorber through which liquid of said vapor is continuously passed, said liquid being at a sufficiently low temperature to provide in said absorber a vapor pressure substantially lower than in said drying chamber but yet above the said triple point pressure whereby to cause vapor to pass from said drying chamber to said absorber where it is condensed in said liquid, a chiller adapted to cool the said liquid from said absorber to a proper temperature for said absorber for passage to said absorber by heat exchange with an evaporating second refrigerant, a means to maintain the said liquid in circulation through said absorber and chiller, and including a means to purge the noncondensible gases from the system,
   d. a second heat pump means adapted for recycling heat recovered from said liquid passing through said chiller to a heat exchange means for supplying heat to effect vacuum drying of said material in said drying chamber thereby eliminating the need to supply heat from an external heat source by compressing at least a portion of the vapor of said second refrigerant evaporating in said chiller and supplying the second refrigerant vapor so compressed to said heat exchange means wherein it condenses thereby supplying heat for effecting freeze-drying of said material and by expanding condensed second refrigerent from said heat exchange means through an expansion valve into said chiller, said second heat pump means including a cooling means for removing excess heat from said second refrigerant in order to maintain heat balance in said heat exchange means and in said chiller,
   e. and a means for continuously removing liquid in order to prevent the accumulation of said liquid in said absorber.

7. A system as claimed in claim 6 in which said heat exchange means comprises a combination of coacting means including:
   a. a cascade heat exchanger in which compressed vapor of second refrigerant is condensed by heat exchange with an evaporating third refrigerant,
   b. a heat exchanger means in which compressed third refrigerant vapor is condensed to supply heat for effecting vacuum drying of said material,
   c. a third heat pump means adapted to compress at least a portion of the vapor of said third refrigerant evaporating in said cascade heat exchanger, pass the third refrigerant vapor so compressed to said heat exchanger means and to pass condensed third refrigerant from said heat exchanger means through an expansion valve into said cascade heat exchanger, said third heat pump means including a cooling means for removing excess heat from said third refrigerant in order to maintain heat balance in said heat exchanger means and in said cascade heat exchanger.

8. A system as claimed in claim 3 in which the cooling means in said first heat pump means comprises a means for condensing a portion of the low pressure first refrigerant vapor by heat exchange with a heat sink external to said first heat pump means and a means for recycling the so condensed first refrigerant to said condenser.

9. A system as claimed in claim 3 in which the cooling means in said second heat pump means comprises a means for condensing a portion of the low pressure second refrigerant vapor by heat exchange with a heat sink external to said second heat pump means and a means for recycling the so condensed second refrigerant to said chiller.

10. A system as claimed in claim 4 in which the cooling means in said third heat pump means comprises a means for condensing a portion of the lower pressure third refrigerant vapor by heat exchange with a heat sink external to said third heat pump means and a means for recycling the so condensed third refrigerant to said cascade heat exchanger.

11. A system as claimed in claim 3 including a subcooling means between said evaporator and said expansion valve of said first heat pump means, said subcooling means supplying heat to a heat sink external to the said first heat pump means for the purpose of subcooling control.

12. A system as claimed in claim 3 including a subcooling means between said heat exchange means and said expansion valve of said second heat pump means, said subcooling means supplying heat to a heat sink external to the said second heat pump means for the purpose of subcooling control.

13. A system as claimed in claim 4 including a subcooling means between said heat exchanger means and said expansion valve of said third heat pump means, said subcooling means supplying heat to a heat sink external to the said third heat pump means for the purpose of subcooling control.

14. A system as claimed in claim 1 for use in freeze-drying a material in which said substance is water, said vapor is substantially water vapor, and in which said absorbent medium in an aqueous solution of a water vapor pressure depressant.

15. A system as claimed in claim 3 for use in vacuum drying a material in which said substance is water, said vapor is substantially water vapor, and in which said absorbent medium in an aqueous solution of a water vapor pressure depressant.

16. A system as claimed in claim 1 in which said means for passing said material through said drying chamber comprises a means for introducing said material into said drying chamber, a means for retaining said material in said drying chamber for a period sufficient to effect drying of said material to the desired moisture content, and a means for removing the dried material from said drying chamber.

17. A system as claimed in claim 16 in which said material is particulate and frozen.

18. A system as claimed in claim 16 in which said material is atomizable and in which the means for introducing said material into said drying chamber comprises a means for atomizing said material in said drying chamber wherein said atomized material freezes due to prevailing low vapor pressure, said chamber being of a sufficient size and said material being atomized at a location in said drying chamber to cause the frozen material to be substantially dried while suspended in said drying chamber.

19. A system as claimed in claim 3 in which said means for passing said material through said drying chamber comprises a means for introducing said material into said drying chamber, a means for retaining said material in said drying chamber for a period sufficient to effect drying of said material to the desired moisture content, and a means for removing the dried material from said drying chamber.

20. A system as claimed in claim 19 in which said material is particulate.

21. A system as claimed in claim 19 in which said material is atomizable and in which the means for introducing said material into said drying chamber comprises a means for atomizing said material in said drying chamber, said chamber being of a sufficient size and said material being atomized at a location in said drying chamber to cause the atomized material to be substantially dried while suspended in said drying chamber.

22. A system as claimed in claim 3 including a separator between said drying chamber and said evacuation means, said separator being adapted to remove partially dried particulate material entrained in vapor passing therethrough and a means for supplying heat to said separator to effect drying of said particulate material, said heat being supplied by one of the heat pump means of said drying system.

* * * * *